G. A. GAUTHIER.
OUTLET BOX BUSHING.
APPLICATION FILED FEB. 12, 1914.
1,129,973.  Patented Mar. 2, 1915.
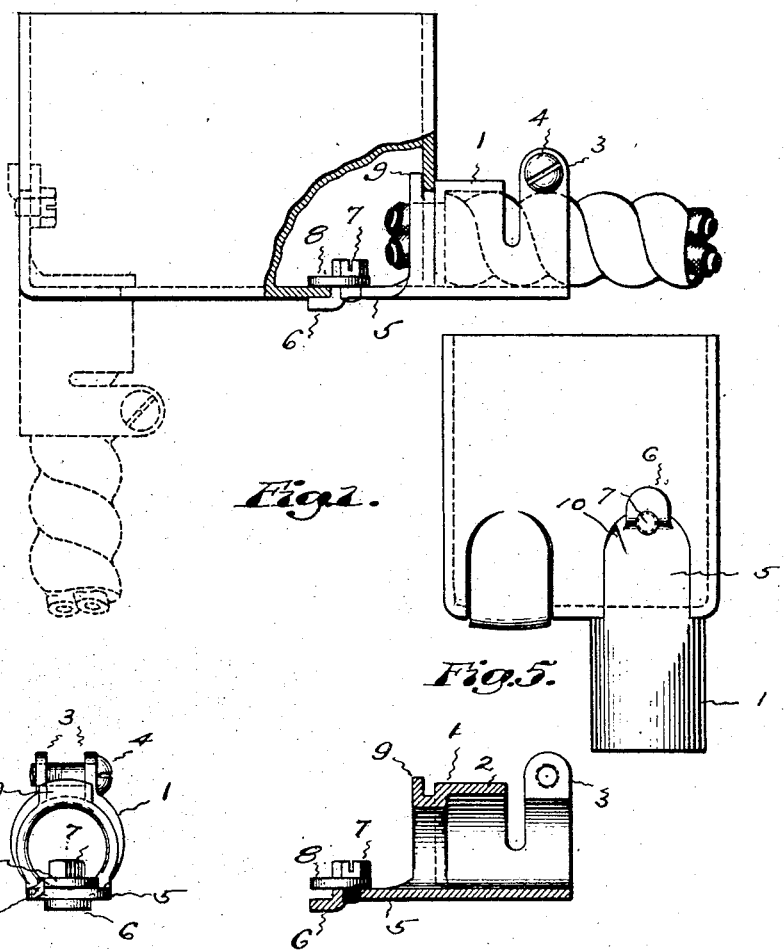
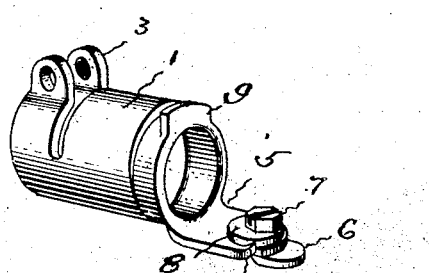
Witnesses:
Josephine A. Strempfer.
Adolph C. Kaiser.
Inventor:
George A. Gauthier
By Harry R. Williams
Atty.

UNITED STATES PATENT OFFICE.

GEORGE A. GAUTHIER, OF HARTFORD, CONNECTICUT, ASSIGNOR TO THE ARROW ELECTRIC COMPANY, OF HARTFORD, CONNECTICUT, A CORPORATION OF CONNECTICUT.

OUTLET-BOX BUSHING.

1,129,973.  Specification of Letters Patent.  Patented Mar. 2, 1915.

Application filed February 12, 1914. Serial No. 818,194.

*To all whom it may concern:*

Be it known that I, GEORGE A. GAUTHIER, a citizen of the United States, residing at Hartford, in the county of Hartford and State of Connecticut, have invented a new and useful Improvement in Outlet-Box Bushings, of which the following is a specification.

Switches, cut-outs, and similar electrical devices are located in metallic boxes set into openings in walls. It is common to provide such boxes with several "knock-outs," any one or more of which, depending upon whether the cables come down from above, up from below, or in from the back, can be removed for the passage of the conductor wires. It is desirable to have the opening in a wall for the box as small as possible and with a small opening when the wires are in a cable, whether the cable comes from above, from below, or from the back, it is awkward and takes time to fish out the ends of the wires that project from the cable and thread them through the proper opening in the back, or top, or bottom of the box, as the case may be.

This invention relates to a thimble or bushing which is designed to be clamped on the end of a flexible conduit or armored cable containing electrical conducting wires, for the purpose of facilitating the entry of the wires into, and the attachment of the conduit or cable to the outlet box containing the electrical apparatus to which the wires are to be connected.

The object of this invention is to provide a simple and cheap bushing which can be easily clamped to the end of a flexible cable and readily located in a small opening in a wall in such manner that when an outlet box is pushed back into the wall opening the bushing will fit into and may be quickly clamped in a knock-out opening so as to form a part of the box wall, whether the cable comes from above, below or back, thereby saving much time and labor and making a neater and better connection than is possible with the present method of making such connections.

Figure 1 of the accompanying drawings shows a side elevation of a switch box with a bushing which embodies this invention shown in full lines attached to the box on the end it is when in use and when the cable with the conductor wires comes from either above or below, and showing in dotted lines the manner of attaching the same bushing to the back of the box as when the cable comes from the back. Fig. 2 is a view looking toward one end of the bushing. Fig. 3 is a central longitudinal section of the bushing. Fig. 4 shows a perspective view of the bushing. Fig. 5 shows an edge view of an outlet box with a bushing inserted in one opening.

The bushing may be cast to shape or bent to form of metal as desired. It has a sleeve-like body 1 for receiving the cable. Preferably there is a shoulder 2 in the interior near one end of the body which is designed to form a stop for the end of the cable. At one end the bushing is split and slotted to make that end yielding. In perforated ears 3 at the yielding end of the sleeve is a screw 4 by means of which the yielding walls may be drawn together for the purpose of clamping the bushing to the end of a cable. At the end opposite the clamping ears the bushing has a projecting arm 5 which is designed to fit the "knock-out" opening in the box that is provided for the bushing. The end of the arm 5 has an offset lip 6 which is designed to extend back of the wall of the box to which the bushing is applied. Pivoted on a screw 7 set into the arm 5 is an eccentric disk 8 which may be turned after the bushing and box are assembled for the purpose of locking the parts together. A lug 9 is provided at the inner end of the body for the purpose of engaging a wall of the box so that the parts will be rigidly connected at that point. The screw head may be slotted as usual and also made polygonal so that it can be turned for releasing or tightening the lock by either a screw driver or wrench. A portion 10 at the end of the arm 5 is desirably turned up to form a stop which will limit the movement of the eccentric disk when it is loosened and turned back.

Outlet boxes are commonly made with portions of the walls at the back corners easily removable so that these portions can be knocked out to provide the necessary openings for the entrance of the wires. These knock-out openings and the arm at the end of the bushing are shaped to correspond so that whichever way the bushing and box are assembled the opening through the bushing and the opening through one side of the box will coincide, and the arm will fit and close the opening on the other side of the corner of the box. This allows the bushing and box to be assembled, whether the cable comes down from above, up from below, or in from the back.

In use, the end of the cable is drawn out of the opening in the wall and after the bushing is clamped thereon, the cable and bushing are pushed back into the opening. The proper knock-out is removed from the box and then the box is simply inserted into the wall opening and pushed back until the end of the bushing fits into the opening which has been provided. After the parts are assembled as described, the eccentric disk 8 is turned so as to engage the wall of the box opposite the lip 6 and the screw 7 is set to hold the disk and thus lock the parts together. The use of this bushing obviates the necessity of fishing for the ends of the wires and threading them through the box. It provides smooth corners which will not cut the insulation on the wires and insures a firm connection between the end of the cable and the box. As the end of the bushing fits the knock-out opening whether applied to the edge or to the back of the box, it makes no difference whether the cable comes down, or up, or from the back, the parts fit together just the same and just as easily, and are as readily locked together.

The invention claimed is:

1. The combination with an outlet box which has an opening through two adjacent walls that are at right angles with each other, of a bushing that has an end removably held to one wall of the box adjacent to the opening, and an arm removably held to the other wall of the box adjacent to the opening.

2. The combination with an outlet box which has an opening through two adjacent walls that are at right angles with each other, of a bushing with a tubular opening registering with the opening through one wall of the box, an arm extending from the bushing and closing the opening through the other wall of the box, and means movably fastening the bushing and the arm to the walls of the box.

3. The combination with an outlet box which has an opening through two adjacent walls that are at right angles with each other, of a bushing with a cable opening and a projecting arm, one end of the bushing fitting the opening through one wall of the box and the arm fitting the opening through the other wall of the box.

4. The combination with an outlet box which has openings of the same shape through two adjacent walls at one corner, of a bushing having an end that conforms to either of said openings and an arm that conforms to either of said openings, whereby the bushing may be attached so as to extend from either wall and when attached the arm will close the opening through the other wall.

5. The combination with an outlet box having an opening through two adjacent walls that are at right angles with each other, of a bushing having a tubular body adapted to fit the opening in either wall and having an arm projecting from the body and adapted to fit the opening in the other wall of the box, and means carried by the bushing for engaging the walls of the opening and fastening the bushing thereto with the body in the opening in one wall and the arm in the opening in the other wall of the box.

6. An outlet box bushing having a tubular body, means for clamping a cable in the body, an arm projecting longitudinally from one end of the body, said arm having substantially the same exterior outline as the exterior outline of the end of the body, and means for locking the bushing to the wall of an outlet box.

7. An outlet box bushing having a tubular body, means for clamping a cable in the body, an arm projecting longitudinally with relation to but in a plane offset from the body, a disk pivoted on said arm, and means for locking and releasing said disk.

8. An outlet box bushing having a tubular body with a split end, means for drawing the split end together for clamping a cable therein, an arm projecting longitudinally with relation to but in a plane offset from one end of the body, a rotatable eccentric disk on said arm, and a screw for clamping said disk.

GEORGE A. GAUTHIER.

Witnesses:
HARRY R. WILLIAMS,
JOSEPHINE M. STREMPFER.